(12) United States Patent
Tacklind

(10) Patent No.: US 8,305,708 B2
(45) Date of Patent: Nov. 6, 2012

(54) DISK DRIVE HAVING A DISK CLAMP WITH OPENINGS DIRECTLY RADIALLY OUTBOARD OF FASTENERS

(75) Inventor: Thomas A. Tacklind, San Martin, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 49 days.

(21) Appl. No.: 13/053,771

(22) Filed: Mar. 22, 2011

(65) Prior Publication Data

US 2012/0243121 A1    Sep. 27, 2012

(51) Int. Cl.
*G11B 17/02* (2006.01)
(52) U.S. Cl. .................................................. 360/99.12
(58) Field of Classification Search ............... 360/99.12, 360/98.08, 99.08, 99.04, 99.09
See application file for complete search history.

(56) References Cited

U.S. PATENT DOCUMENTS

| | | | |
|---|---|---|---|
| 5,274,517 A | 12/1993 | Chen | |
| 5,295,030 A | 3/1994 | Tafreshi | |
| 5,517,376 A | 5/1996 | Green | |
| 5,790,345 A | 8/1998 | Alt | |
| 6,483,661 B1 | 11/2002 | Martin et al. | |
| 6,690,637 B1 | 2/2004 | Codilian | |
| 6,724,568 B1 | 4/2004 | Suwito et al. | |
| 6,741,418 B2 * | 5/2004 | Renken | 360/98.08 |
| 6,754,042 B1 | 6/2004 | Chiou et al. | |
| 6,850,389 B2 | 2/2005 | Drake et al. | |
| 7,042,676 B2 | 5/2006 | Yoo | |
| 7,126,787 B2 | 10/2006 | Chan et al. | |
| 7,158,343 B2 | 1/2007 | Kim | |
| 7,164,554 B2 | 1/2007 | Sirilutporn et al. | |
| 7,209,320 B1 * | 4/2007 | Woods et al. | 360/99.12 |
| 7,212,377 B1 | 5/2007 | Ou-Yang et al. | |
| 7,239,476 B2 | 7/2007 | Chan et al. | |
| 7,545,601 B2 | 6/2009 | Hanada et al. | |
| 7,602,583 B2 | 10/2009 | Makita | |
| 7,773,339 B2 | 8/2010 | Nguyen et al. | |
| 2007/0058292 A1 * | 3/2007 | Choi et al. | 360/99.12 |
| 2007/0230039 A1 | 10/2007 | Koizumi et al. | |

* cited by examiner

*Primary Examiner* — Allen Cao

(57) ABSTRACT

A disk drive includes a spindle motor attached to a disk drive base. The spindle motor includes a hub that rotates about a spindle rotation axis. An annular disk is mounted on the hub. A clamp contacts a top surface of the hub. The clamp includes first and second pluralities of openings therethrough. The clamp is attached to the hub by a plurality of fasteners, each of the plurality of fasteners passing through one of the first plurality of openings. Each of the second plurality of openings has a closed outer periphery within the clamp. Each of the first plurality of openings is disposed directly between the spindle rotation axis and a corresponding one of the second plurality of openings.

19 Claims, 2 Drawing Sheets

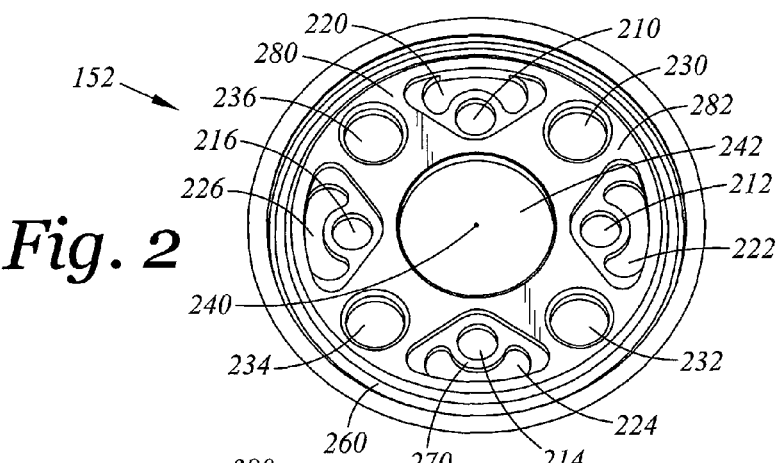
*Fig. 2*
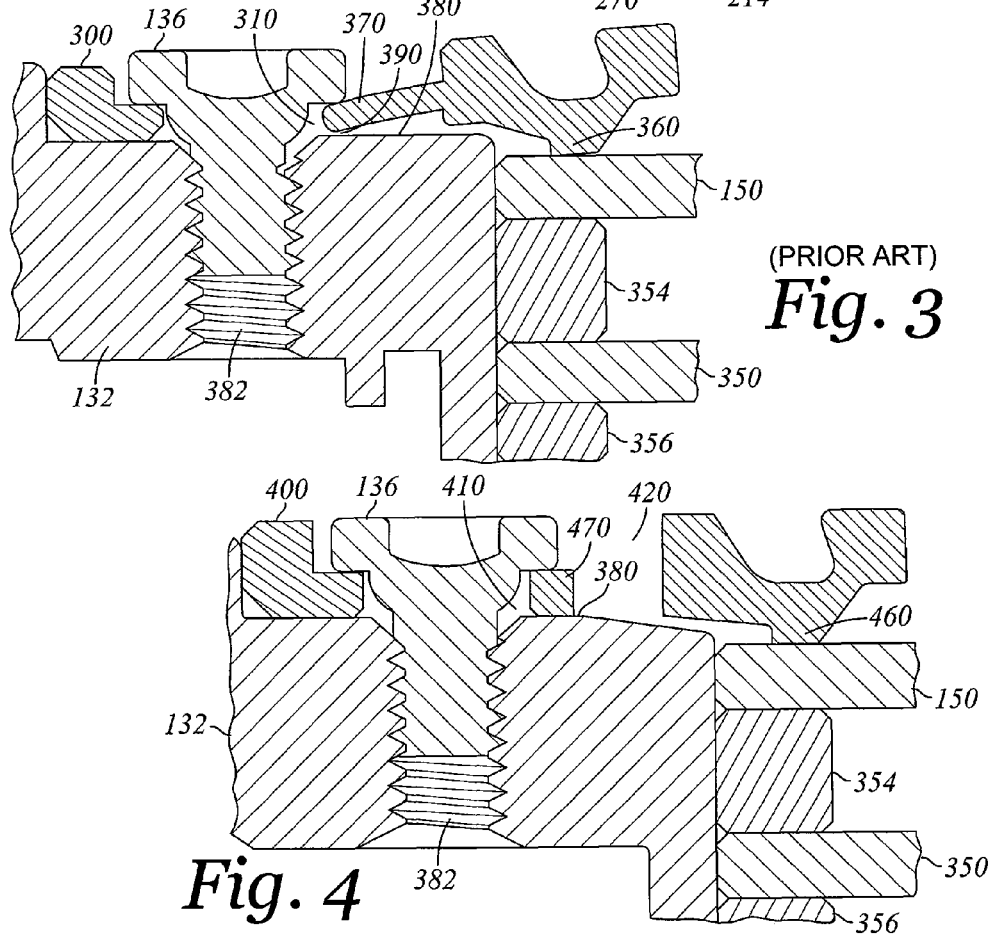
(PRIOR ART)
*Fig. 3*
*Fig. 4*

DISK DRIVE HAVING A DISK CLAMP WITH OPENINGS DIRECTLY RADIALLY OUTBOARD OF FASTENERS

BACKGROUND

The typical hard disk drive includes a head disk assembly (HDA) and a printed circuit board (PCB) attached to a disk drive base of the HDA. The head disk assembly includes at least one disk (such as a magnetic disk, magneto-optical disk, or optical disk), which is clamped to a rotating hub of a spindle motor. A head stack assembly (HSA) is actuated to position heads adjacent the major surfaces of the disk(s), to read and write information stored thereon. The printed circuit board assembly includes electronics and firmware for controlling the rotation of the spindle motor, for controlling the actuation and position of the HSA, and for providing a data transfer channel between the disk drive and its host.

The head stack assembly typically includes an actuator, at least one head gimbal assembly (HGA), and a flex cable assembly. Each HGA includes a head for reading and writing data from and to an adjacent disk surface. In magnetic recording applications, the head typically includes an air bearing slider and a magnetic transducer that comprises a writer and a read element. The magnetic transducer's writer may be of a longitudinal or perpendicular design, and the read element of the magnetic transducer may be inductive or magnetoresistive. In optical and magneto-optical recording applications, the head may include a minor and an objective lens for focusing laser light on an adjacent disk surface.

The spindle motor typically includes the rotating hub (on which annular disks are mounted and clamped), a magnet attached to the hub, and a stator. Various coils of the stator are selectively energized to form an electromagnetic field that pulls/pushes on the magnet, thereby rotating the hub. Rotation of the spindle motor hub results in rotation of the mounted disks.

Many contemporary disk clamps are attached to the spindle motor hub by screws that are arranged in a circle around the spindle motor shaft (e.g. a non-rotating shaft). When the screws are tightened, they cause the clamping pressure to be non-uniform, such that the regions near each screw exert higher clamping pressure and the areas between the screws exert lower clamping pressure. Such non-uniform clamping pressure may produce an undesirably large sinusoidal warping of the clamped disk(s). The resulting curvature of the disk surface is known as "disk crown".

Disk crown due to non-uniform clamping can modulate and affect the microscopic spacing between the disk surface and the adjacent read/write head. Such microscopic spacing affects the performance of the head in reading and writing, and so excessive disk crown can adversely affect the performance and signal to noise ratio (SNR) associated with disk drive operations. Therefore, there is a need in the art for a disk drive design having a disk clamp that exerts a more uniform clamping pressure on the disk(s).

The screws that attach a contemporary disk clamp to the spindle motor hub typically do not force the disk clamp to lie flat against a top surface of the spindle motor hub in the region around each screw. There is a good reason why; in many designs some finite vertical or tilt clearance between the clamp and the top surface of the spindle motor hub may be required so that the torque on the screws can vary the clamping pressure applied to the annular disk. However, it may be desirable to decrease the sensitivity of clamping pressure on screw torque, for example to decrease manufacturing variation in clamping pressure. Therefore, there is a need in the art for a disk drive design having a disk clamp that can reduce the sensitivity of clamping pressure on screw torque.

Also, some particulate and other contamination may escape from the screws and screw holes in the spindle motor hub, via the previously described finite vertical or tilt clearance between the clamp and the top surface of the spindle motor hub. Such contaminants, if excessive, may cause head crash or otherwise decrease the reliability of the disk drive if they spread within the head disk assembly (e.g. by being spun off by the centrifugal force associated with spindle hub rotation). Therefore, there is a need in the art for a disk drive design having a disk clamp that can better contain contamination that may escape from the screws and screw holes in the spindle motor hub.

BRIEF DESCRIPTION OF THE DRAWINGS

FIG. 2 is a top perspective view of a disk clamp according to an embodiment of the present invention.

FIG. 3 is a radial cross-sectional view of a portion of a spindle motor hub, disk clamp, fastener, disks, and spacer rings, according to the prior art.

FIG. 4 is a radial cross-sectional view of a portion of a spindle motor hub, disk clamp, fastener, disks, and spacer rings, according to an embodiment of the present invention.

DESCRIPTION OF PREFERRED EMBODIMENTS

Figure 1:
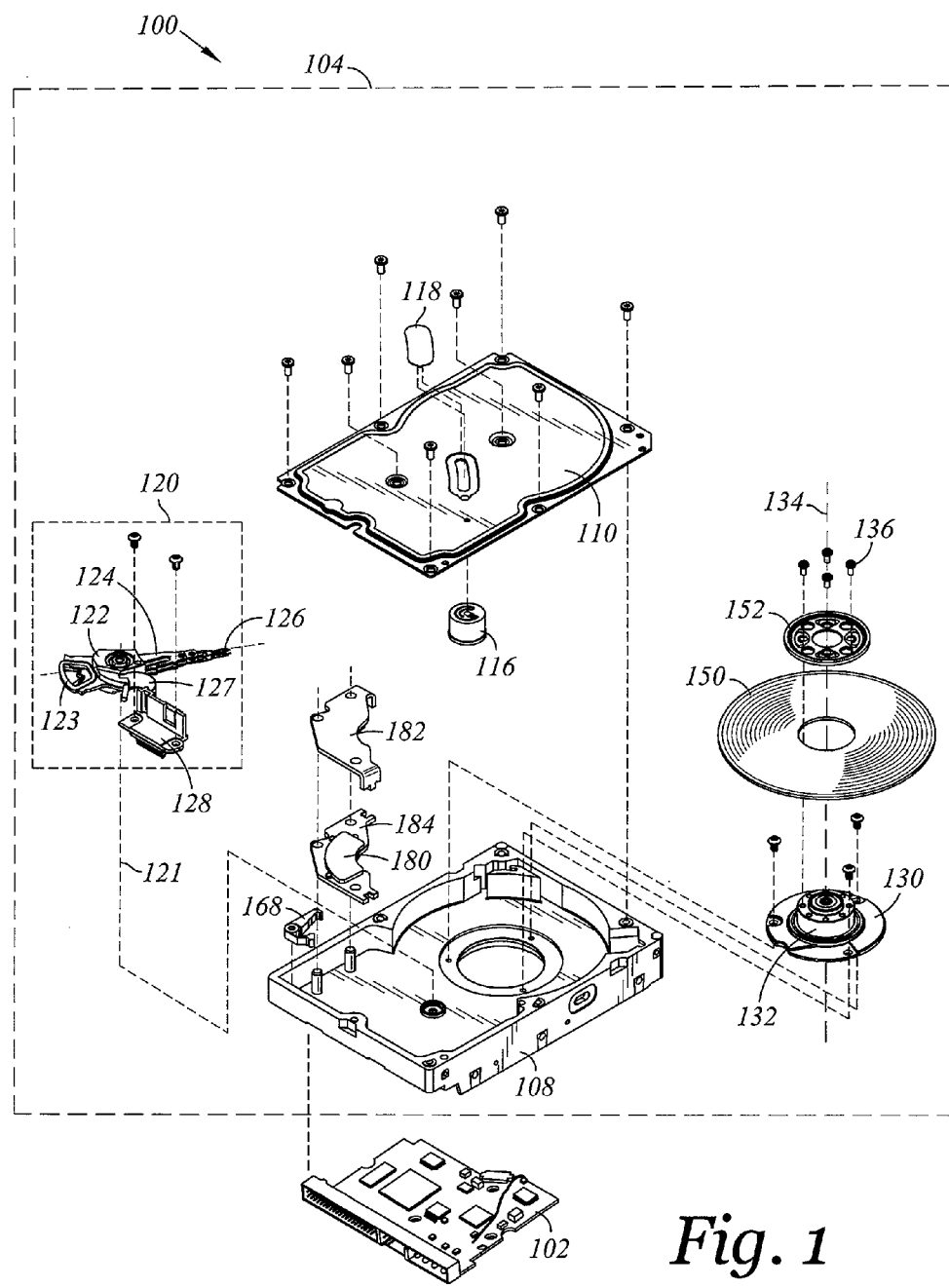
FIG. 1 is an exploded perspective view of a disk drive according to an embodiment of the present invention.

FIG. 1 is an exploded perspective view of a disk drive 100 according to an embodiment of the present invention. The disk drive 100 includes a head disk assembly (HDA) 104 and a printed circuit board assembly (PCBA) 102. The PCBA 102 includes conventional circuitry for processing signals and controlling the operations of the disk drive 100. The HDA 104 includes a base 108 and a cover 110 attached to the base 108 to collectively house at least one annular disk 150, a head stack assembly (HSA) 120 rotatably attached to the base 108, and a spindle motor 130 attached to the base 108. The spindle motor 130 rotates a hub 132 about a spindle rotation axis 134, for the hub 132 may be cylindrical and rotated at a constant angular velocity. The annular disk 150 is mounted on, is clamped to, and rotates with, the hub 132. In certain embodiments, the disk drive 100 of FIG. 1 may include a plurality of annular disks 150 that are mounted on the hub 132 of the spindle 130. For example, annular disk 150 may be a top disk under which one or more additional disks may be mounted on the hub 132 of the spindle 130. The disk(s) 150 may comprise an aluminum, glass, or ceramic substrate, for example with the substrate being coated with a NiP under-layer, a thin-film magnetic layer, a diamond-like amorphous carbon protective layer, and a very thin lubricant layer.

In the embodiment of FIG. 1, the HSA 120 comprises a swing-type or rotary actuator 122. At least one actuator arm 124 may be cantilevered from the actuator 122. The rotary actuator 122 may be fabricated of a metal material such as aluminum, stainless steel, magnesium, beryllium, or an alloy thereof, by casting and/or forging. The HSA 120 also includes at least one head gimbal assembly (HGA) 126, a flex cable 127, and a flex cable bracket 128 fixed to the base 108. The HGA 126 supports a head (not visible in this view) adjacent to the annular disk 150, for writing and reading data to and from the annular disk 150.

In magnetic recording hard disk drive applications, the head may include a magneto resistive sensor for reading data from disk 150, and a longitudinal or perpendicular type inductive transducer for writing data to disk 150. In optical or magneto-optical recording applications, the head may include an objective lens for focusing laser light upon the recording media surface. The storage capacity of the disk drive 100 may be increased by the use of additional annular disks 150 and by the HSA 120 having correspondingly more HGAs 126 supported by multiple actuator arms 124.

In the embodiment of FIG. 1, a voice coil motor (VCM) may include top and bottom VCM plates 182, 184 mounted to the base 108. One or both of the VCM plates may include a permanent magnet (e.g. permanent magnet 180). The VCM plates 182, 184 form a yoke to carry magnetic flux from the permanent magnet(s). The coil 123 of the actuator 122 may be disposed between the top and bottom VCM plates 182 and 184 to cause rotation of the HSA 120 about a pivot axis 121, in response to an electrical current passed through the coil 123.

In this way, the VCM controllably positions the head(s) of the HSA 120 relative to the annular disk 150 for writing and/or reading data. The angular range of HSA pivoting may be limited by one or more stops, and the HSA may be held adjacent a stop by a latch (e.g. actuator latch 168). In certain embodiments, the cover 110 may include an opening for a breather filter 116 and a covering 118 for a larger opening for use in servo writing the annular disk 150. The base 108 may be attached to the cover 110 by means of screws or another conventional fastening method.

FIG. 2 is a top perspective view of a disk clamp 152 according to an embodiment of the present invention. The clamp 152 includes a first plurality of openings 210, 212, 214, 216, therethrough. The clamp 152 also includes a second plurality of openings 220, 222, 224, 226, therethrough. Each of the second plurality of openings 220, 222, 224, 226 has a closed outer periphery within the clamp 152. The clamp 152 may comprise a metal such as steel, aluminum, and/or alloys thereof. For example, steel may be stainless steel, spring steel, etc.

In the embodiment of FIG. 2, each of the first plurality of openings 210, 212, 214, 216 is disposed directly between the center 240 of the clamp 152, and a corresponding one of the second plurality of openings 220, 222, 224, 226. In this context, "directly between" means radially between and circumferentially aligned. That is, any radius extending from center 240 of the clamp 152 and intersecting one of the first plurality of openings 210, 212, 214, 216, will also intersect the corresponding one of the second plurality of openings 220, 222, 224, 226. This is not necessarily true vice versa; for example, in the embodiment of FIG. 2, each of the first plurality of openings 210, 212, 214, 216 is smaller than corresponding ones of the second plurality of openings 220, 222, 224, 226. Note that in the embodiment of FIG. 2, the center 240 of the clamp 152 lies in an optional central hole 242. In certain embodiments, such an arrangement of the second plurality of openings 220, 222, 224, 226 with respect to the first plurality of openings 210, 212, 214, 216 may substantially improve the uniformity of clamping pressure applied by the clamp 152 to the clamped annular disk (e.g. annular disk 150 of FIG. 1).

In the embodiment of FIG. 2, each of the second plurality of openings 220, 222, 224, 226 is large enough to include (enclose within its contour) an arc that spans at least 50° about the corresponding one of the first plurality of openings 210, 212, 214, 216. Preferably but not necessarily, each of the second plurality of openings 220, 222, 224, 226 is large enough to include (enclose within its contour) an arc that spans 70° to 120° about the corresponding one of the first plurality of openings 210, 212, 214, 216. In certain embodiments, such arcuate dimensional ranges may further improve the uniformity of clamping pressure applied by the clamp 152 to the clamped annular disk (e.g. annular disk 150 of FIG. 1).

In the embodiment of FIG. 2, the clamp 152 includes a clamp outer periphery 260 and a clamp inner region 270. Each of the first plurality of openings 210, 212, 214, 216 is disposed in the clamp inner region 270. The clamp outer periphery 260 is connected to the clamp inner region 270 by a plurality of spokes that are disposed between two of the second plurality of openings 220, 222, 224, 226. For example, spoke 280 is disposed between openings 220 and 226, and spoke 282 is disposed between openings 220 and 222. In the embodiment of FIG. 2, the clamp outer periphery 260, the clamp inner region 270, and the plurality of spokes (e.g. spokes 280 and 282), are all a single component having material continuity rather than being an assembly of sub-components.

The exploded view of FIG. 1 depicts how the clamp 152 of FIG. 2 may be assembled with other components of a disk drive (e.g. disk drive 100). Now referring to both FIG. 1 and FIG. 2, the clamp 152 contacts a top surface of the hub 132, and the clamp 152 is attached to the hub 132 by a plurality of fasteners 136. Each of the plurality of fasteners 136 passes through one of the first plurality of openings 210, 212, 214, 216. For example, each of the plurality of fasteners 136 may be a screw that extends into a corresponding threaded hole in the hub 132.

Now referring to FIGS. 1 and 2, each of the first plurality of openings 210, 212, 214, 216 is disposed directly between the spindle rotation axis 134 and a corresponding one of the second plurality of openings 220, 222, 224, 226. In this context, "directly between" means radially between and circumferentially aligned. That is, any radius extending normally from the spindle rotation axis 134 and intersecting one of the first plurality of openings 210, 212, 214, 216, will also intersect the corresponding one of the second plurality of openings 220, 222, 224, 226. Still referring to FIGS. 1 and 2, each of the second plurality of openings 220, 222, 224, 226 is disposed directly outboard from a corresponding one of the plurality of fasteners 136, along a radius extending from the spindle rotation axis 134.

Now referring again to FIG. 1, the hub 132 is shown to also optionally include a plurality of balance weight receptacles (e.g. note that the top surface of the hub has eight peripheral holes, rather than merely the four holes that are aligned to receive the fasteners 136). In the embodiment of FIG. 2, the clamp 152 optionally includes a third plurality of openings 230, 232, 234, 236, each of which being preferably aligned with a corresponding one of the plurality of balance weight receptacles in the hub 132. Such alignment may allow a balance weight to be inserted in a chosen balance weight receptacle via one of the third plurality of openings, after the clamp 152 has been fastened to the hub 132.

In certain alternative embodiments of the present invention, each of the second plurality of openings 220, 222, 224, 226 may be aligned with a corresponding one of the plurality of balance weight receptacles in the hub 132. Such alignment may allow a balance weight to be inserted in a chosen balance weight receptacle of the hub 132 via one of the second plurality of openings 220, 222, 224, 226, after the clamp is fastened to the hub 132, even where the clamp lacks a third plurality of openings.

FIG. 3 is a radial cross-sectional view of a portion of a spindle motor hub 132, conventional disk clamp 300, fastener 136, annular disks 150, 350, and spacer rings 354, 356, according to the prior art. The fastener 136 is a screw that passes through a first opening 310 in the conventional disk clamp 300, and extends into a threaded hole 382 of the hub 132. An inner region 370 of the conventional clamp 300 receives a downward force from the fastener 136, which, in turn, provides a clamping pressure between the outer periphery 360 of the conventional clamp 300 and the top disk 150. However, the downward force from the fastener 136 is not always sufficient to cause contact between the inner region 370 of the conventional clamp 300 and a top surface 380 of the hub 132. For example, a vertical or tilt clearance 390 exists between the inner region 370 of the conventional disk clamp 300 and the top surface 380 of the hub 132. The threaded hole 382, and the interaction between the fastener 136 and the threaded hole 382, may be a source of contamination (e.g. particulate contamination). The vertical or tilt clearance 390 may facilitate such contaminants to spread within the disk drive, which may cause head crash or otherwise decrease the reliability of the disk drive.

FIG. 4 is a radial cross-sectional view of a portion of a spindle motor hub 132, novel disk clamp 400, fastener 136, annular disks 150, 350, and spacer rings 354, 356, according to an embodiment of the present invention. In the embodiment of FIG. 4, the fastener 136 is a screw that passes through a first opening 410 in the novel disk clamp 400, and extends into a threaded hole 382 of the hub 132. In the embodiment of FIG. 4, a top surface 380 of the hub 132 defines a surface normal that is parallel to the spindle rotation axis (e.g. spindle rotation axis 134 of FIG. 1), and that is parallel to a screw longitudinal axis of the threaded hole 382 in the hub 132.

In the embodiment of FIG. 4, the clamp 400 is in contact with the hub 132 contiguously around the first opening 410, so that the first opening 410 is contiguously encircled by such contact. For example, the clamp inner region 470 is in contact with the top surface 380 of the hub 132. The clamp outer periphery 460 contacts and applies a clamping pressure to the annular disk 150, but the clamp outer periphery 460 is not in contact with the top surface of the hub 132. Note that in the embodiment of FIG. 4, a first thickness of the clamp 400, that is measured parallel to the spindle rotation axis at the clamp outer periphery 460, is preferably but not necessarily greater than a second thickness of the clamp 400 that is measured parallel to the spindle rotation axis in the clamp inner region 470. In certain embodiments, such an inequality may improve the uniformity of clamping pressure applied by the outer periphery 460 to the annular disk 150.

In the embodiment of FIG. 4, the first opening 410 is disposed directly between the center of the clamp 400 (to the left of FIG. 4 as drawn), and a second opening 420 through the clamp 400. That is, the second opening 420 is disposed directly outboard from the fastener 136 in FIG. 4. This arrangement may improve the circumferential uniformity of clamping pressure applied by the clamp 400 to the clamped annular disk (e.g. annular disk 150).

In the foregoing specification, the invention is described with reference to specific exemplary embodiments, but those skilled in the art will recognize that the invention is not limited to those. It is contemplated that various features and aspects of the invention may be used individually or jointly and possibly in a different environment or application. The specification and drawings are, accordingly, to be regarded as illustrative and exemplary rather than restrictive. For example, the word "preferably," and the phrase "preferably but not necessarily," are used synonymously herein to consistently include the meaning of "not necessarily" or optionally. "Comprising," "including," and "having," are intended to be open-ended terms.

I claim:

1. A disk drive comprising:
   a disk drive base;
   a spindle motor attached to the disk drive base, the spindle motor including a hub that rotates about a spindle rotation axis;
   an annular disk mounted on the hub;
   a clamp contacting a top surface of the hub, the clamp including a first plurality of openings therethrough and a second plurality of openings therethrough, the clamp attached to the hub by a plurality of fasteners, each of the plurality of fasteners passing through one of the first plurality of openings;
   wherein each of the second plurality of openings has a closed outer periphery within the clamp, and each of the first plurality of openings is disposed directly between the spindle rotation axis and a corresponding one of the second plurality of openings.

2. The disk drive of claim 1 wherein each of the first plurality of openings is smaller than corresponding ones of the second plurality of openings.

3. The disk drive of claim 1 wherein each of the plurality of fasteners is a screw that extends into a corresponding threaded hole in the hub.

4. The disk drive of claim 3 wherein the top surface of the hub defines a surface normal that is parallel to the spindle rotation axis, and each of the threaded holes defines a screw longitudinal axis that is parallel to the spindle rotation axis.

5. The disk drive of claim 1 wherein the clamp is in contact with the hub contiguously around each of the first plurality of openings, so that each of the first plurality of openings is contiguously encircled by such contact.

6. The disk drive of claim 1 wherein the disk drive includes a read head disposed adjacent to the annular disk.

7. The disk drive of claim 1 wherein the hub is substantially cylindrical in shape.

8. The disk drive of claim 1 wherein the hub includes a plurality of balance weight receptacles, and each of the second plurality of openings is aligned with a corresponding one of the plurality of balance weight receptacles.

9. The disk drive of claim 1 wherein the hub includes a plurality of balance weight receptacles, and the clamp further includes a third plurality of openings, and each of the third plurality of openings is aligned with a corresponding one of the plurality of balance weight receptacles.

10. The disk drive of claim 1 wherein a first radius extending normally from the spindle rotation axis and intersecting one of the first plurality of openings, intersects a corresponding one of the second plurality of openings.

11. The disk drive of claim 1 wherein, for each one of the first plurality of openings, an arc, defined outside of that one the first plurality of openings and spanning at least 50° about that one of the first plurality of openings, is included within the corresponding one of the second plurality of openings.

12. The disk drive of claim 11 wherein the arc spans 70° to 120° about that one of the first plurality of openings.

13. The disk drive of claim 1 wherein the clamp includes a clamp outer periphery and a clamp inner region, each of the first plurality of openings being disposed in the clamp inner region, and wherein the clamp outer periphery is connected to the clamp inner region by a plurality of spokes, each of the plurality of spokes being disposed between two of the second plurality of openings.

14. The disk drive of claim 13 wherein a first thickness of the clamp, that is measured at the clamp outer periphery, is greater than a second thickness of the clamp that is measured in the clamp inner region.

15. The disk drive of claim 13 wherein the clamp outer periphery, the clamp inner region, and the plurality of spokes, are all a single component having material continuity rather than being an assembly of sub-components.

16. The disk drive of claim 15 wherein the clamp inner region is in contact with the top surface of the hub, and the clamp outer periphery is not in contact with the top surface of the hub.

17. The disk drive of claim 1 wherein the clamp comprises steel.

18. A disk drive comprising:
a disk drive base;
a spindle motor attached to the disk drive base, the spindle motor including a hub that rotates about a spindle rotation axis;
an annular disk mounted on the hub;
a clamp contacting a top surface of the hub, the clamp including a first plurality of openings therethrough and a second plurality of openings therethrough, the clamp attached to the hub by a plurality of fasteners, each of the plurality of fasteners passing through one of the first plurality of openings;
wherein each of the second plurality of openings has a closed outer periphery within the clamp, and each of the second plurality of openings is disposed directly outboard from a corresponding one of the plurality of fasteners, along a radius extending from the spindle rotation axis.

19. The disk drive of claim 18 wherein each one of the second plurality of openings includes an arc defined outside of the corresponding one the first plurality of openings and spanning at least 50° about the corresponding one the first plurality of openings.

* * * * *